United States Patent [19]

Bahr et al.

[11] Patent Number: 4,939,287
[45] Date of Patent: Jul. 3, 1990

[54] CHIRAL ESTERS OF MESOGENIC CARBOXYLIC ACIDS

[75] Inventors: Christian Bahr; Gerd Heppke; Detlef Lötzsch; Feodor Oestreicher, all of Berlin, Fed. Rep. of Germany

[73] Assignee: Hoechst Aktiengesellschaft, Frankfurt am Main, Fed. Rep. of Germany

[21] Appl. No.: 912,790

[22] Filed: Sep. 26, 1986

[30] Foreign Application Priority Data

Sep. 30, 1985 [DE] Fed. Rep. of Germany ....... 3534778

[51] Int. Cl.$^5$ .................... C07C 69/773; C07C 69/78; C07C 69/80
[52] U.S. Cl. ......................... 560/66; 560/1; 560/85; 560/86; 560/102
[58] Field of Search ...................... 560/66, 85, 102, 86, 560/98

[56] References Cited

U.S. PATENT DOCUMENTS 4,264,148  4/1981  Goble-Wunsch et al. ......... 350/346

FOREIGN PATENT DOCUMENTS 2613293  10/1977  Fed. Rep. of Germany .
2827471  9/1982  Fed. Rep. of Germany .
3333677  4/1985  Fed. Rep. of Germany .
1603075  11/1981  United Kingdom .
2125043  2/1984  United Kingdom .

Primary Examiner—Werren B. Lone
Assistant Examiner—Vera C. Clarke
Attorney, Agent, or Firm—Curtis, Morris & Safford

[57] ABSTRACT

The novel esters of a chiral alcohol and a mesogenic carboxylic acid are characterized by the general formula (I)

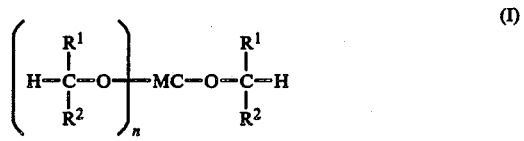

in which the symbols have the following meanings:
n denotes 0 or 1,
$R^1$ denotes a straight-chain or branched ($C_1$-$C_4$)alkyl which is unsubstituted or substituted by halogen, in particular fluorine,
$R^2$ denotes unsubstituted or substituted ($C_6$-$C_{18}$)aryl, cyclo($C_5$-$C_{12}$)alkyl or mononuclear or binuclear heteroaryl possessing a five-membered and/or six-membered ring, and
MC denotes a molecular radical of a mesogenic monocarboxylic acid MC-OH after elimination of an OH group where n=0, and denotes a molecular radical of a mesogenic dicarboxylic acid HO-MC-OH after elimination of two OH groups where n=1, with the exception of compounds in which n denotes 0, $R^1$ denotes $CH_3$, $R^2$ denotes phenyl and MC denotes

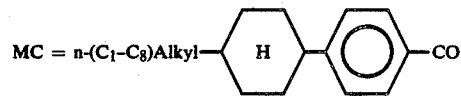

These esters are preferably used as admixtures in twistable liquid crystal phases, in which they produce temperature compensation and a large twist.

1 Claim, No Drawings

CHIRAL ESTERS OF MESOGENIC CARBOXYLIC ACIDS

The characteristics of the electrooptical effects used in liquid crystal displays generally change with temperature. Particularly in the case of operation in the multiplex mode, this gives rise to difficulties which may lead to an undesirable restriction of the operating temperature range. In the case of various electrooptical effects, the temperature dependence of the electrooptical characteristics can be advantageously influenced by adding chiral compounds to the nematic liquid crystal, via the temperature function of the pitch of the cholesteric helical structure induced as a result, for example in the case of the cholesteric-nematic phase transformation effect, the TN ("twisted nematic") cell and the recently reported SBE ("supertwisted birefringence effect"). The usual known admixtures generally induce a pitch which increases with increasing temperature; recently, admixtures have also been described which do not exhibit this effect, which is frequently undesirable.

DE-C 28 27 471 (=US-A 4 264 148) discloses the addition of two different chiral admixtures to nematic carrier substances; one chiral admixture produces a right-handed twist in the nematic carrier substance, while the other produces a left-handed twist. A decrease in pitch is achieved with admixing of this type, but relatively high total concentrations are required to achieve this effect, and these concentrations may have an adverse effect on the other material parameters.

DE-A 33 33 677 describes, inter alia, reaction products (esters) of the chiral compound butane-2,3-diol with mesogenic carboxylic acids, which, even when used as individual admixtures in liquid crystal phases, can simplify the procedure for optimizing the temperature compensation. However, these known esters frequently have a twisting capacity which is still too small for certain applications. The "pc product" corresponding to the reciprocal of the twisting capacity is 9.2 to 116 $\mu$m.% by weight according to this DE-A.

The optically active esters according to JP-A 58-146 663 are described by the general formula

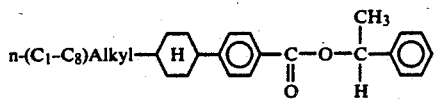

and are said to be suitable as admixtures for nematic liquid crystal phases and to be able to produce a right-hand or left-hand twist in these phases. However, they do not meet practical requirements in every case.

It is therefore an object of the present invention to provide novel compounds which, when used as chiral admixtures in liquid crystal phases and even when added in relatively small amounts, optimize the temperature compensation and at the same time produce a large twist of the induced helical structures.

The invention starts from a known ester of a chiral alcohol and a mesogenic carboxylic acid. The compounds according to the invention are characterized by the general formula (I)

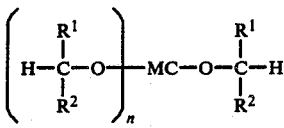

in which the symbols have the following meanings:
n denotes 0 or 1,
$R^1$ denotes a straight-chain or branched $(C_1-C_4)$alkyl which is unsubstituted or substituted by halogen, in particular fluorine,
$R^2$ denotes unsubstituted or substituted $(C_6-C_{18})$aryl, cyclo$(C_5-C_{12})$alkyl or mononuclear or binuclear heteroaryl possessing a five-membered and/or six-membered ring, and
MC denotes a molecular radical of a mesogenic monocarboxylic acid MC-OH after elimination of an OH group, where n=0, and denotes a molecular radical of a mesogenic dicarboxylic acid HO-MC-OH after elimination of two OH groups where n =1, with the exception of compounds in which n denotes 0, R1 denotes phenyl and MC denotes

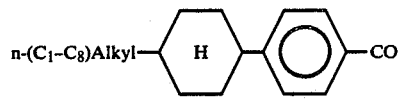

Another embodiment of the invention is a twistable liquid crystal phase containing at least one chiral compound, wherein the said phase contains at least one compound of the general formula (I) as the chiral compound. The term "twistable liquid crystal phase" is understood as meaning nematic, cholesteric and tilted smectic, in particular smectic C ($S_c$ or SmC), phases.

The twistable liquid crystal phases according to the invention consist of 2 to 20, preferably 2 to 15, components, including at least one of the chiral admixtures claimed according to the invention. The other components are preferably selected from amongst the known compounds exhibiting nematic, cholesteric and/or tilted smectic phases, including, for example, Schiff bases, biphenyls, terphenyls, phenylcyclohexanes, cyclohexylbiphenyls, pyrimidines, cinnamic acid esters, cholesterol esters and various bridged polynuclear esters of p-alkylbenzoic acids, possessing polar terminal groups. In general, the commercially available liquid crystal phases are in the form of mixtures of a very wide variety of components even before the addition of the chiral admixture, and at least one of these components is mesogenic, i.e. exhibits a liquid crystal phase as a compound, in derivatized form or mixed with certain cocomponents [is expected to form at least one enantiotropic (clear point>melting point) or monotropic (clear point<melting point) mesophase].

With the aid of the recently developed compounds as admixtures, it is possible to achieve a large twist in liquid crystal phases using a small amount of admixture, the compounds furthermore having a pitch which is essentially independent of temperature change, i.e. the increase or decrease in pitch, which is generally in the range from 1% to 1°/00per K, is in particular less than 3°/00. The product p.c (p=pitch of the induced helical structure in $\mu$m, c=concentration of the chiral admixture in % by weight) is less than 9, in particular between 0.5 and 6. Some of the compounds according to the invention are good additives for converting tilted smectic phases, in particular SmC phases, into ferroelectric liquid crystal phases, this suitability increasing as the spontaneous polarization values ($P_s$) in $nC.cm^{-2}$ increase. They can also be used in thermotopography or for producing "blue phases" (=cholesteric systems having a relatively small pitch of, for example, less than 800 nm).

Among the compounds of the general formula (I), those in which n=0 are preferred, i.e. chiral esters of monocarboxylic acids. The radical MC (the same also applies to dicarboxylic diesters in which n=1) then denotes [expressed by the general formula (II)]:

$$R^3\text{-}(A^1\text{-})_{n1}(B\text{-})_{n2}(A^2\text{-})_{n3}CO \quad (II)$$

in which the symbols have the following meaning:
- $R^3$ is straight-chain or branched ($C_1$-$C_{12}$)alkyl in which one or two non-adjacent $CH_2$ groups can be replaced by 0 atoms or, where n1=1, also F, Cl, Br or CN,
- $A^1$ and $A^2$ independently of one another are 1,4-phenylene, pyrimidine-2,5-diyl, 1,4-cyclohexylene, 1,3-dioxane-2,5-diyl, 1,3-dithiane-2,5-diyl or 1,4-bicyclo(2,2,2)octylene, where these groups can furthermore be at least monosubstituted by F, Cl, Br, CN and/or ($C_1$-$C_{12}$)alkyl (if appropriate, one or two nonadjacent $CH_2$ groups may be replaced by 0 atoms),
- B is CO-0, 0-CO, $CH_2$-$CH_2$, $OCH_2$, $CH_2O$, CH=N, N=CH, N=N or N(O)=N, and
- n1, n2 and n3 independently of one another are 0, 1 or 2, and n1 and n3 are not simultaneously 0.

Preferred compounds are once again those in which the symbols have the following meaning: $R^3$ is straight-chain ($C_4$-$C_{10}$)alkyl, where one $CH_2$ group may be replaced by an 0 atom, $A^1$ and $A^2$ independently of one another are unsubstituted 1,4-phenylene or 1,4-cyclohexylene, B is CO-0 or 0-CO, n1 is 1, n2 is 0 or 1 and n3 is 1 or 2.

Accordingly, radicals MC of dicarboxylic acids H-0-MC-0-H (where n=1) are then to be understood as meaning those radicals in which, in the general formula (II), $R^3$ is replaced by OC.

Other preferred compounds are those in which, in the general formula (I), the symbols have the following meaning: n=0, $R^1$=$CH_3$ or $CF_3$ and $R^2$=($C_6$-$C_{18}$)aryl.

The liquid crystal phases generally contain 0.01 to 70% by weight, in particular 0.05 to 50% by weight, of the admixture or admixtures according to the invention.

Examples and Comparative Examples

Synthesis method (1)

(R)-1-Phenyleth-1-yl 4-(4-n-hexyloxy-benzoyloxy)-bnezoate 100 mmol of $SOCl_2$ are added to 10 mmol of the mesogenic compound 4-(4-n-hexyloxy-benzoyloxy)-benzoic acid. 5 drops of pyridine are added and the reaction mixture is heated under reflux for 2 hours. The excess $SOCl_2$ is stripped off (distilled off). The resulting acyl chloride is dissolved in pyridine. The optically active 1-phenylethan-1-ol is slowly added to the solution in an equimolar amount, and the reaction mixture is then heated under reflux for 5 hours. The mixture is filtered, the solution is evaporated down and the residue is purified over a silica gel column. The recrystallized product corresponds to the stated formula (1) according to the analytical data (elemental analysis, NMR spectrum and IR spectrum).

The compounds (2) to (6) below are synthesized similarly, a two-fold molar amount of alcohol being used in the second reaction stage in the case of the diester (6).

(2)

(S)-1-Phenyleth-1-yl 4'-n-pentyl-4-diphenylcarboxylate (3)

(R)-1-Phenyl-2,2,2-trifluoroeth-1-yl 4-(trans-4-n-heptyl-cyclohexyl)-benzoate (4)

(S)-1-(9'-Anthryl)-2,2,2-trifluoroethan-1-yl 4-(trans-4-n-heptylcyclohexyl)-benzoate (5)

(S)-1-(9'-Anthryl)-2,2,2-trifluoroeth-1-yl 4'-n-pentyl-4-diphenylcarboxylate (6)

The diester of 4,4-diphenyldicarboxylic acid with (S)-1-(9'-anthryl)-2,2,2-trifluroethan-1-ol Method of Use (X)

(Y)

One of the compounds (1) to (6) and, for comparison, one of the compounds (X) and (Y) is added to a commercial nematic wide-range mixture—"RO-TN 404" from Hoffmann-La Roche Aktiengesellschaft (Basel/Switzerland)—having a clear point of 104° C.; the comparative compounds are the commercial chiral admixtures "CB 15" from BDH (British Drug House), Poole (UK) and "S 811" from E. Merck, Darmstadt (Germany). The twist in $\mu m.\%$ by weight (=p.c)—stated at a temperature of 25° C.—and the temperature dependence of the pitch in 0/00 per K are then determined in this liquid crystal phase.

The spontaneous polarization ($P_s$)—where this is measurable—is determined in the SmC phase of the commercial compound "HEPTOAB" (manufacturer e.g. Frinton, USA) having the characteristic data "K 74.4 SmC 95.4 N 124.2 J", and is compared with (X) and (Y) and additionally with a known compound (Z) having ferroelectric properties.

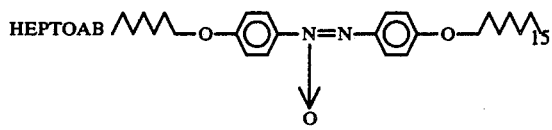

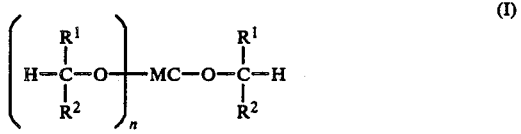

In both series of measurements, 10 mol % of each dopant are added.

| Compound | p · c (μm · % by weight at 25°) | Temperature dependence (% per K) | $P_s$ (nC per cm²) | Measurement temperature (°C.) |
| --- | --- | --- | --- | --- |
| 1 | +6.2 | 1 | 11.1 | 65 |
| 2 | −5.1 | 1 | — | — |
| 3 | −4.6 | 1 | 7.3 | 65 |
| 4 | +2.1 | 1 | — | — |
| 5 | +1.9 | 1 | — | — |
| 6 | +9.0 | 1 | — | — |
| X | +14 | 4 | — | — |

-continued

| Compound | p · c (μm · % by weight at 25°) | Temperature dependence (% per K) | $P_s$ (nC per cm²) | Measurement temperature (°C.) |
| --- | --- | --- | --- | --- |
| Y | −8.5 | 2 | 4.5 | 75 |
| Z | — | — | 0.5 | 65 |

We claim:

1. An ester of a chiral alcohol and a mesogenic carboxylic acid, which ester is of the formula (I)

$$\left( \begin{array}{c} R^1 \\ | \\ H-C-O \\ | \\ R^2 \end{array} \right)_n MC-O-\begin{array}{c} R^1 \\ | \\ C-H \\ | \\ R^2 \end{array} \tag{I}$$

wherein:
n is 0 or 1,
$R^1$ is a straight-chain or branched ($C_1$–$C_4$)alkyl which is unsubstituted or substituted by fluorine,
$R^2$ is unsubstituted or substituted ($C_6$–$C_{18}$)aryl or cyclo($C_5$–$C_{12}$)alkyl and
MC is a molecular radical of a mesogenic monocarboxylic acid MC-OH after elimination of an OH group where n=0, and is a molecular radical of a mesogenic dicarboxylic acid HO-MC-OH after elimination of two OH groups where n=1, with the exception of compounds in which n is 0, $R^1$ is $CH_3$, $R^2$ is phenyl and MC is

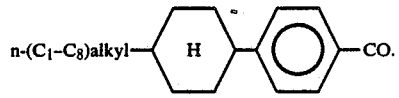

* * * * *